United States Patent
Jo

(10) Patent No.: US 9,922,752 B2
(45) Date of Patent: Mar. 20, 2018

(54) HYDROPHOBIC FILM COATED CABLE FOR MEDICAL DEVICE

(71) Applicant: SAMSUNG MEDISON CO., LTD., Gangwon-do (KR)

(72) Inventor: Young Ran Jo, Busan (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 372 days.

(21) Appl. No.: 14/680,816

(22) Filed: Apr. 7, 2015

(65) Prior Publication Data
US 2016/0180986 A1   Jun. 23, 2016

(30) Foreign Application Priority Data
Dec. 17, 2014   (KR) .................... 10-2014-0181964

(51) Int. Cl.
| | | |
|---|---|---|
| *H01B 7/28* | (2006.01) | |
| *H01B 3/44* | (2006.01) | |
| *H01B 3/00* | (2006.01) | |
| *C09D 183/00* | (2006.01) | |

(52) U.S. Cl.
CPC ......... *H01B 7/2813* (2013.01); *C09D 183/00* (2013.01); *H01B 3/00* (2013.01); *H01B 3/443* (2013.01); *H01B 7/28* (2013.01)

(58) Field of Classification Search
CPC ........... H01B 7/295; H01B 3/441; H01B 7/00
USPC ............................. 174/107, 112 R
See application file for complete search history.

(56) References Cited

U.S. PATENT DOCUMENTS

| | | | |
|---|---|---|---|
| 6,176,849 B1 | 1/2001 | Yang et al. | |
| 2008/0217044 A1* | 9/2008 | Carlson ............... | H01B 7/1885 174/113 R |
| 2013/0168128 A1 | 7/2013 | Lopez-Gonzalez | |
| 2015/0034359 A1* | 2/2015 | Sugita .................... | H01B 3/441 174/107 |

FOREIGN PATENT DOCUMENTS

| | | |
|---|---|---|
| CN | 202008854 U | 10/2011 |
| JP | 3070817 B2 | 7/2000 |
| JP | 2007018842 A | 1/2007 |

OTHER PUBLICATIONS

Thermal Crosslinking of Chlorinated Polydimethylsiloxane-Poly(vinyl Chloride) Blends, Journal of Applied Polymer Science, vol. 46, No. 2, Sep. 15, 1992, pp. 363-368.
Extended European Search Report issued in European Application No. 15160248.9 dated Jun. 2, 2016.
European Communication (Decision on Grant) dated Apr. 12, 2017 issued in European Patent Application No. 15 160 248.9.

\* cited by examiner

*Primary Examiner* — Jennifer Chriss
*Assistant Examiner* — Ricardo Lopez
(74) *Attorney, Agent, or Firm* — McDermott Will & Emery LLP

(57) ABSTRACT

Disclosed herein is a hydrophobic cable, particularly a cable for medical devices having a hydrophobic surface. The hydrophobic cable includes a conductive unit arranged in a longitudinal direction of the cable, an insulating sheath coated onto an outer portion of the conductive unit and made of a PVC material, and a coating film formed outside the insulating sheath. Here, the coating film may be formed by curing a coating solution including at least one monomer selected from the group consisting of a silane compound and a siloxane compound.

8 Claims, 9 Drawing Sheets

DIPPING COATING

SPRAY COATING

HYDROPHOBIC FILM COATED CABLE FOR MEDICAL DEVICE

CROSS-REFERENCE TO RELATED APPLICATION

This application claims the benefit of Korean Patent Application No. 10-2014-0181964, filed on Dec. 17, 2014 in the Korean Intellectual Property Office, the disclosure of which is incorporated herein by reference.

BACKGROUND

1. Field

Embodiments of the present invention relate to a cable, and more particularly, to a hydrophobic cable having a hydrophobic coating film formed on a surface thereof.

2. Description of the Related Art

A cable is composed of a bundle of electrical conductors used to connect two or more devices. The cable may be prepared so that the cable includes a conductor configured to transmit electrical signals, and a protective sheath serving as an insulator configured to surround the conductor.

A packing material may be used to prevent contamination of the exterior of such a cable. Such a packing material may serve to protect the exterior of the cable from being contaminated or damaged, the events of which may be caused during shipment of the cable.

It is very important to maintain medical devices cleanly in their use environments. When a cable itself is contaminated after a packing material of the cable for medical devices is removed from the cable, the medical devices may give unpleasant feelings to patients.

Therefore, users should use the cable in a state in which a packing material is not separated from the cable so as to prevent the exterior of the cable from being contaminated even after the cable is installed in an installation site.

SUMMARY

Therefore, it is an aspect of the present invention to provide a hydrophobic cable including a coating film, which is formed by being coated with a coating solution including at least one selected from the group consisting of a silane compound and a siloxane compound.

Additional aspects of the invention will be set forth in part in the description which follows and, in part, will be obvious from the description, or may be learned by practice of the invention.

In accordance with one aspect of the present invention, a hydrophobic cable includes a conductive unit arranged in a longitudinal direction of the cable, an insulating sheath coated onto an outer surface of the conductive unit and made of a polyvinyl chloride (PVC) material, and a coating film formed outside the insulating sheath. Here, the coating film may be formed by curing a coating solution including at least one monomer selected from the group consisting of a silane compound and a siloxane compound.

In this case, the monomer may have at least one organic functional group and at least one inorganic functional group.

Also, the organic functional group may include at least one organic functional group selected from the group consisting of an organic alkoxy group and an amino group.

In addition, the inorganic functional group may include a metal alkoxide-based inorganic functional group.

Further, the monomer may be represented by the following Formula 1:

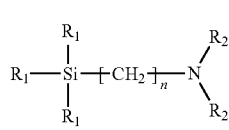

Formula 1 wherein R1 represents at least one selected from the group consisting of a methoxy group and an ethoxy group; R2 represents at least one selected from the group consisting of hydrogen, a methyl group, an ethyl group, and a propyl group; and n is 3.

Also, the coating film may have a hydrogenated silicon structure.

In addition, the coating film may be coupled to the insulating sheath by means of a condensation reaction.

Additionally, the condensation reaction may include a condensation reaction between the organic functional group of the monomer and a chloride group of the PVC.

Further, the hydrophobic cable may include a cable for medical devices.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
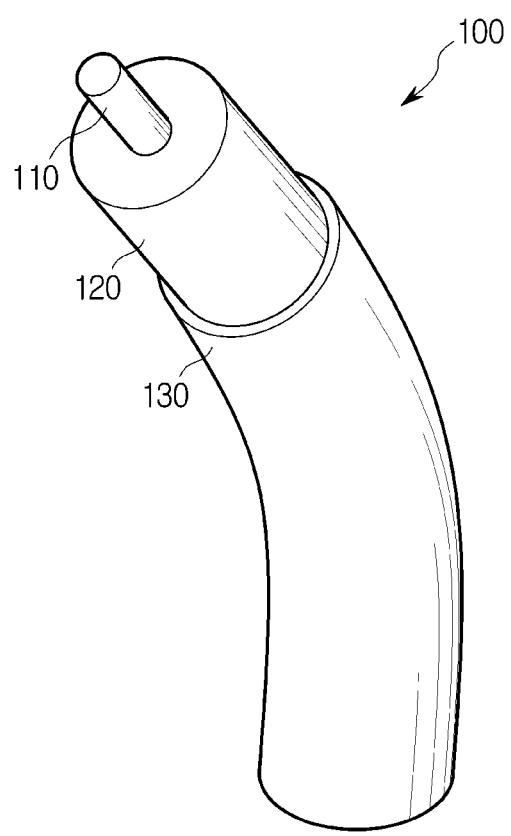
FIG. 1 is a view illustrating a cable according to one exemplary embodiment of the present invention.

Reference will now be made in detail to the embodiments of the present invention, examples of which are illustrated in the accompanying drawings, wherein like reference numerals refer to like elements throughout.

A cable is a kind of an electric wire, which is used to connect two or more devices and generally has a circular cross section. The cable may be extended to connect the devices, and the length of the cable may be properly determined according to a purpose of use. Hereinafter, a cable having a predetermined length is presented in the accompanying drawings for the sake of convenience, but the length of the cable is not limited thereto.

The cable may be applied to various fields within the scope of the present invention so as to connect two or more devices. Hereinafter, a cable for medical devices will be described by way of example for the sake of convenience of description, but one example of the cable used is not limited thereto.

Figure 2:
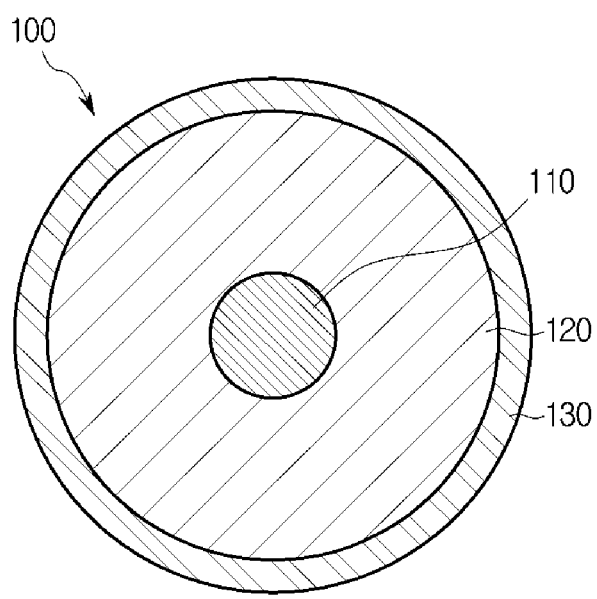
FIG. 2 is a cross-sectional view of the cable according to one exemplary embodiment of the present invention.

FIG. 1 is a view illustrating a cable 100 according to one exemplary embodiment of the present invention, and FIG. 2 is a cross-sectional view of the cable 100 according to one exemplary embodiment of the present invention.

Referring to FIGS. 1 and 2, the cable 100 according to one exemplary embodiment of the present invention may include a conductive unit 110, an insulating sheath 120, and a coating film 130.

The conductive unit 110 may be arranged in a longitudinal direction of the cable 100. The conductive unit 110 may be provided in the form of a plurality of conductor strands, and the conductor strands may be provided to have different diameters. The conductive unit 110 may be made of a conductive material such as cooper, aluminum, etc., but types of the conductive unit 110 are not limited thereto.

The insulating sheath 120 may be provided to surround the conductive unit 110. The insulating sheath 120 may be coated onto an outer portion of the conductive unit 110 to electrically insulate the conductor. Cotton, a natural rubber, a synthetic rubber, a plastic, vinyl, and the like may be used as the insulating sheath 120. The material of the insulating sheath 120 may be altered according to an applicable scope of the cable 100.

For example, the main body of an ultrasonic imaging device, and the insulating sheath 120 of the cable 100 for medical devices provided to transmit a signal of a probe may include polyvinyl chloride (PVC), which is one of thermoplastic resins, as a main ingredient. More specifically, the main body of the ultrasonic imaging device and the insulating sheath 120 of the cable 100 may include soft PVC as a main ingredient.

According to one exemplary embodiment, a semi-conducting layer may be formed between the conductive unit 110 and the insulating sheath 120. The semi-conducting layer may be formed by wrapping the conductive unit 110 with a semi-conductive tape. Fibers (fabrics) including fine carbon particles may be used as the semi-conductive tape. In this case, the semi-conductive tape may also serve to prevent or minimize corona discharge occurring between the conductive unit 110 and the insulating sheath 120.

The coating film 130 may be formed outside the insulating sheath 120. The coating film 130 may be formed by be coated with a coating solution. More particularly, the coating solution may include at least one monomer selected from the group consisting of a silane compound and a siloxane compound.

The term "silane" refers to a kind of a hydride of silicon. The formula of the silane may be represented by 'SinH2n+2.' The silane compound refers to a compound in which at least one hydrogen atom is substituted with another reactive group in the formula SinH2n+2. In this case, it is possible to obtain compounds having various properties according to the types of the substituted reactive group.

The term "siloxane" refers to a compound including a siloxane bond (Si—O), and may be obtained by reacting a halogen substituent of the silane with water. That is, the siloxane may be included in a wide range of the silane compounds.

The monomer may be represented by the following Formula 1:

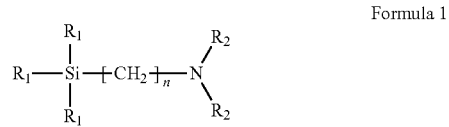

Formula 1 wherein R1 represents at least one selected from the group consisting of a methoxy group and an ethoxy group, R2 represents at least one selected from the group consisting of hydrogen, a methyl group, an ethyl group, and a propyl group, and n is 3.

Referring to Formula 1, the silane or siloxane compound may have at least one organic functional group and at least one inorganic functional group. The organic functional group according to one exemplary embodiment may include an organic alkoxy group, an amino group, and the like, and the inorganic functional group according to one exemplary embodiment may include a metal alkoxide, and the like.

When the silane compound or compound represented by Formula 1 has an excessively high molecular weight, the coating solution is in a gel phase, which makes it difficult to form the coating film 130. Therefore, types of alkyl group are preferably selected within a range properly maintaining the viscosity of the coating solution.

Hereinafter, a process of coating a surface of the insulating sheath 120 with the coating solution to form the coating film 130 will be described in further detail.

The coating film 130 may be formed using a wet process or a dry process.

Figure 3:
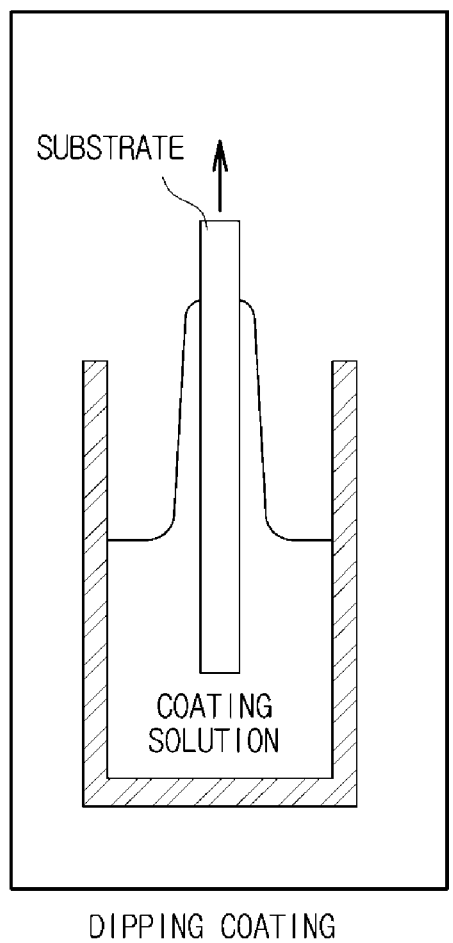
FIG. 3 is a view illustrating a dipping coating process that is a wet process.

FIG. 3 is a view illustrating a dipping coating process that is a wet process.

As shown in FIG. 3, the dipping coating is a process of dipping the cable 100 in the coating solution for a predetermined period of time, withdrawing the cable 100 from the coating solution, and evaporating a solvent component. The dipping coating may also be used to coat a substrate having an uneven surface. The cable 100 according to one exemplary embodiment of the present invention may also be coated using a dipping coating process.

Figure 4:
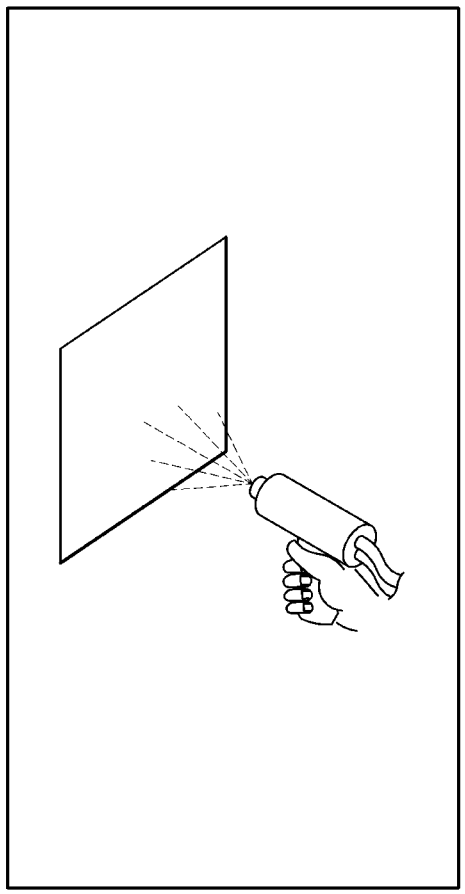
FIG. 4 is a view illustrating a spray coating process.

FIG. 4 is a view illustrating a spray coating process.

As shown in FIG. 4, the spray coating is a process of spraying the coating solution through a spray nozzle when the coating solution has low viscosity. The spray coating has advantages in that the coating film 130 may be uniformly formed even when the surface of the substrate is irregular or uneven, a smaller amount of the coating solution may be used than that of the dipping coating, and the quantity of energy required to evaporate the solvent is reduced. The coating solution used herein may be present in a liquid phase, and may have low viscosity, and the cable 100 may be coated with the coating solution using a spray coating method.

Meanwhile, in addition to the wet process as shown in FIGS. 3 and 4, a process of soaking the coating solution according to one exemplary embodiment of the present invention in a sponge, and the like, rubbing the cable 100 with the sponge, and curing the coating solution at room temperature may also be used.

The coating solution applied to the above-described process is a single-liquid coating solution rather than an organic/inorganic hybrid two-liquid coating solution, and may be coated to a small thickness of 50 μm or less.

Therefore, the splitting or peeling of the coating film 130 may not occur even after a soft surface of the cable 100 having bendability is coated with the coating film 130.

Such a coating film 130 may be bound to a surface of the insulating sheath 120 by means of a condensation reaction as shown in the following Chemical Scheme 1. Here, the condensation reaction may be a condensation reaction between the organic functional group of the above-described monomer and the chloride group of PVC.

Chemical Scheme 1

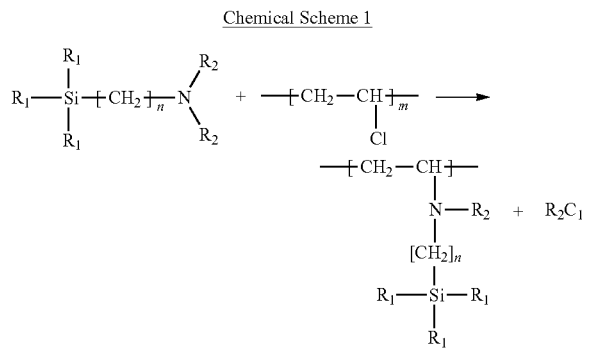

wherein R1 represents at least one selected from the group consisting of a methoxy group and an ethoxy group, R2 represents at least one selected from the group consisting of hydrogen, a methyl group, an ethyl group, and a propyl group, n is 3, and m is an integer ranging from 1 to 20.

The condensation reaction as shown in Chemical Scheme 1 may be performed using the chloride group of PVC and the amino group of the monomer, thereby forming a covalent bond between a nitrogen atom of the amino group and a carbon atom of PVC.

Figure 5:
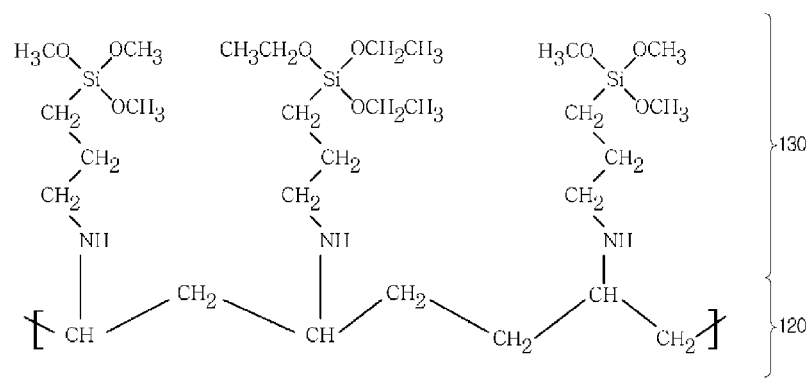
FIG. 5 is an enlarged view illustrating a binding structure of the coating film.

FIG. 5 is an enlarged view illustrating a binding structure of the coating film 130.

As shown in FIG. 5, the coating film 130 may be bound to a surface of the insulating sheath 120 via the covalent bond between the nitrogen atom of the amino group and the carbon atom of PVC. According to one exemplary embodiment, the coating film 130 may be formed to have a thickness of approximately 50 μm, but the thickness of the coating film 130 is not limited thereto.

Upon formation of the coating film 130, the inorganic functional group of the silane compound, or the inorganic functional group of the siloxane compound is oriented outward from a surface of the substrate. The plurality of inorganic functional groups interact on each other by means of a force such as a dispersion force, and may form a hard binding structure of the coating film 130. As a result, the cable 100 has lower surface energy, compared to that before the coating of the coating film 130.

The term "surface energy" refers to the free energy of the surface. Generally, the higher the surface energy is, the higher the adhesive strength attracting fine dust and acting to water is. That is, the dust floating in the air may be easily adsorbed into substances or materials having polarities such as hydrophilicity due to the characteristics such as static electricity.

In the case of the cable 100 according to this exemplary embodiment, the surface energy may decrease due to the presence of the coating film 130 formed on a surface of the cable 100, thereby giving hydrophobicity to the surface of the cable 100. That is, the coating film 130 may be formed on the insulating sheath 120 made of PVC having hydro- philicity to give hydrophobicity, which makes it possible to prevent adsorption of dust and easily wash the cable 100 with water.

Hereinafter, the contact angle properties of the hydrophobic cable 100 will be described to aid in understanding the principle of a self-cleaning ability of the hydrophobic cable 100.

Figure 6:
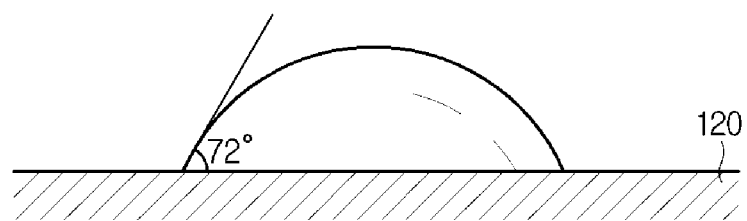
FIG. 6 is a view illustrating a contact angle of the cable with respect to water before coating the coating film.
Figure 7:
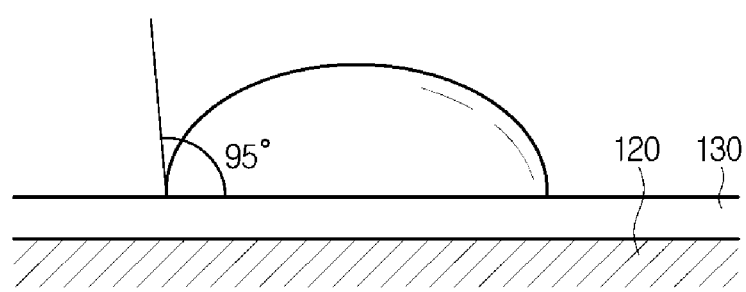
FIG. 7 is a view illustrating a contact angle of the hydrophobic cable according to one exemplary embodiment of the present invention with respect to water.

FIG. 6 is a view illustrating a contact angle of the cable 100 with respect to water before coating the coating film 130, and FIG. 7 is a view illustrating a contact angle of the hydrophobic cable 100 according to one exemplary embodiment of the present invention with respect to water.

The contact angle refers to a predetermined angle formed between a horizontal solid surface and a liquid surface when a droplet becomes a waterdrop which is maintained in a certain lens shape when the droplet is placed on the solid surface. The contact angle is determined according to the types of the liquid and solid. Generally, when it is assumed that the liquid spreads on the solid surface to wet the solid surface when the contact angle is less than 90°, the surface of the solid is considered not to be wetted since the liquid is maintained in the form of a waterdrop on the solid surface when the contact angle is greater than 90°.

In the case of the cable 100 for medical devices according to one exemplary embodiment, it is easy to remove the dust from the surface of the cable 100 using a piece of cloth soaked in water. Therefore, a change in the contact angle properties before and after the coating of the cable 100 will be described based on the contact angle properties of the surface of the cable 100 with respect to water.

As shown in FIG. 6, the contact angle of the cable 100 with respect to water before the coating of the coating film 130 may be shown to be approximately 72°. That is, the contact angle of the insulating sheath 120, which includes PVC as a main ingredient, with respect to water is less than 90°. As a result, water may spread on the insulating sheath 120 to wet the insulating sheath 120.

As shown in FIG. 7, the contact angle of the cable 100 with respect to water after the coating of the coating film 130 may be shown to be approximately 95°. That is, the contact angle of the coating film 130, which has a hydrogenated silicon structure formed on a surface thereof, with respect to water is greater than 90°. As a result, water may be maintained in the form of a waterdrop on a surface of the coating film to wet a surface of the cable 100.

Hereinafter, the self-cleaning ability of the hydrophobic cable 100 according to one exemplary embodiment will be described with reference to FIGS. 6 and 7.

Figure 8:
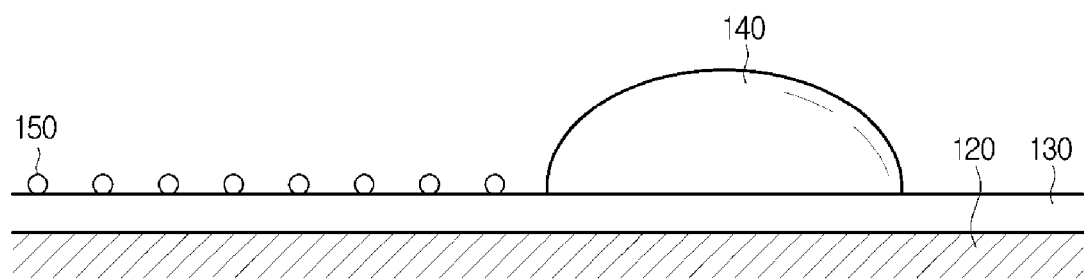
FIG. 8 is a view illustrating a surface of the coating film contaminated with foreign substances.
Figure 9:
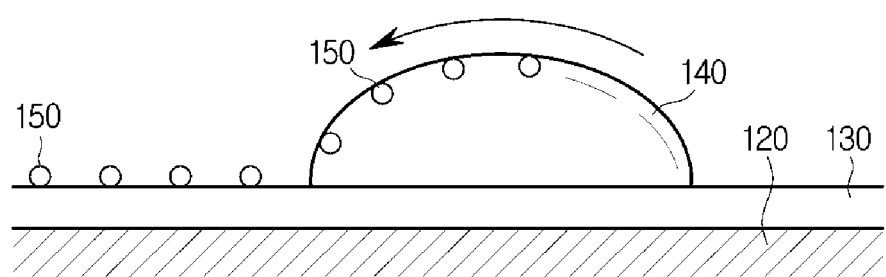
FIG. 9 is a view illustrating that foreign substances are removed as a waterdrop moves along a surface of the coating film.

FIGS. 8 and 9 are views for explaining the self-cleaning ability of the hydrophobic cable 100. FIG. 8 is a view illustrating a surface of the coating film 130 contaminated with foreign substances 150, and FIG. 9 is a view illustrating that foreign substances 150 are removed as a waterdrop 140 moves along the surface of the coating film 130.

The term "self-cleaning ability" refers to an ability of the cable 100 to easily wash contaminants on a water-repellent surface using only a waterdrop 140. The coating film 130 according to this exemplary embodiment may exhibit higher self-cleaning characteristics due to relatively low surface energy, compared to that before the coating.

As shown in FIG. 8, the foreign substances 150 floating in the air may be adsorbed onto a surface of the coating film 130 of the cable 100. When moisture is provided to the surface of the coating film 130 to remove such foreign substances 150, the waterdrop 140 closer to a sphere may be formed on the surface of the coating film 130. Here, the waterdrop 140 may be formed to have a contact angle of approximately 95°, which is as described with reference to FIG. 7.

As shown in FIG. 9, the waterdrop 140 may move in a predetermined direction with certain directionality due to the slope of the surface of the coating film 130. In this case, the waterdrop 140 may be removed together with the dust adsorbed on a moving path. That is, the coating film 130 may have a self-cleaning ability to be easily washed with water due to the low surface energy of the coating film 130.

The hydrophobic cable according to one exemplary embodiment of the present invention can be useful in preventing the dust from being adsorbed under external environments due to the presence of the coating film formed on a surface of the hydrophobic cable.

Also, the hydrophobic cable according to one exemplary embodiment of the present invention can have a self-cleaning ability to be easily washed with water due to the presence of the coating film formed on the surface of the hydrophobic cable.

Although various preferred embodiments of the cable 100 of the present invention have been shown and described, it would be appreciated by those skilled in the art that changes and modifications may be made in these embodiments without departing from the principles and spirit of the invention, the scope of which is defined in the claims and their equivalents.

What is claimed is:

1. A hydrophobic cable comprising:
   a conductive unit arranged in a longitudinal direction of the cable;
   an insulating sheath coated onto an outer portion of the conductive unit and made of a polyvinyl chloride (PVC) material; and
   a coating film formed outside the insulating sheath,
   wherein the coating film is formed by curing a coating solution comprising at least one monomer selected from the group consisting of a silane compound and a siloxane compound,
   wherein the monomer has at least one inorganic functional group,
   wherein the inorganic functional group comprises a metal alkoxide-based inorganic functional group.

2. The hydrophobic cable according to claim 1, wherein the monomer has at least one organic functional group and at least one inorganic functional group.

3. The hydrophobic cable according to claim 2, wherein the organic functional group comprises at least one organic functional group selected from the group consisting of an organic alkoxy group and an amino group.

4. The hydrophobic cable according to claim 1, wherein the monomer is represented by the following Formula 1:

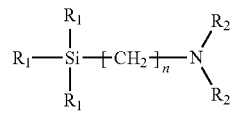

Formula 1 wherein R1 represents at least one selected from the group consisting of a methoxy group and an ethoxy group;
R2 represents at least one selected from the group consisting of hydrogen, a methyl group, an ethyl group, and a propyl group; and
n is 3.

5. The hydrophobic cable according to claim 1, wherein the coating film has a hydrogenated silicon structure.

6. The hydrophobic cable according to claim 1, wherein the coating film is coupled to the insulating sheath by means of a condensation reaction.

7. The hydrophobic cable according to claim 6, wherein the condensation reaction comprises a condensation reaction between the organic functional group of the monomer and a chloride group of the PVC.

8. The hydrophobic cable according to claim 1, wherein the hydrophobic cable comprises a cable for medical devices.

* * * * *